(12) United States Patent
Lagergren et al.

(10) Patent No.: US 8,826,246 B2
(45) Date of Patent: Sep. 2, 2014

(54) SYSTEM AND METHOD FOR USING PARTIAL SOFTWARE OBJECT DEMATERIALIZATION IN A VIRTUAL MACHINE

(75) Inventors: Marcus Lagergren, Lidingo (SE); Patrik Torstensson, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 1084 days.

(21) Appl. No.: 12/464,324

(22) Filed: May 12, 2009

(65) Prior Publication Data
US 2010/0293542 A1  Nov. 18, 2010

(51) Int. Cl.
*G06F 9/45*   (2006.01)
(52) U.S. Cl.
USPC ............ 717/140; 717/148; 717/151; 717/153
(58) Field of Classification Search
None
See application file for complete search history.

(56) References Cited

U.S. PATENT DOCUMENTS 5,535,389 A * 7/1996 Elder et al. .................... 717/170
2008/0148246 A1  6/2008 Lagergren

FOREIGN PATENT DOCUMENTS

WO   WO0022492   4/2000

OTHER PUBLICATIONS

Kotzmann, et al., "Design of the Java HotSpot™ Client Compiler for Java 6", ACM Transaction on Architecture and Code Optimization, vol. 5, No. 1, Article 7, May 2008, 32 pages.
Chamberlin, "A Complete Guide to DB2 Universal Database", Morgan Kaufman Publishers, Inc., San Francisco, CA USA, 1998, 6 pages.
European Search Report in connection with Application No. 10250891.8 dated Aug. 16, 2010, 9 pages.
Manson, J. et al., JSR-133: Java™ Memory Model and Thread Specification, Aug. 24, 2004, http://www.cs.umd.edu/~pugh/java/memoryModel, 43 pages.

* cited by examiner

*Primary Examiner* — Qamrun Nahar
(74) *Attorney, Agent, or Firm* — Meyer IP Law Group (57) ABSTRACT

A system and method for partial object dematerialization within a virtual machine (VM), and particularly Java Virtual Machines. In accordance with an embodiment, the system allows for applying partial object dematerialization to situations where the object is either created locally, or is retrieved from external code where it might have already escaped. In accordance with an embodiment, the system comprises a computer; a virtual machine for executing a software application; memory space for the application byte code and the generated machine code; and a compiler with an object dematerializer, and dematerializer injector. Runtime partial object dematerialization code is injected into the intermediate code representation in such a way that additional or standard optimizer techniques can be applied to it.

20 Claims, 7 Drawing Sheets

SYSTEM AND METHOD FOR USING PARTIAL SOFTWARE OBJECT DEMATERIALIZATION IN A VIRTUAL MACHINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method for using partial software object dematerialization in a virtual machine.

BACKGROUND

Object dematerialization is a technique for optimizing object oriented programs, based on the fact that objects are often created and destroyed within the same scope. It is common that for such temporary objects, not all fields are used. When a compiler detects that an object only lives within a single scope and that only a few fields are really put to use, then the compiler can (instead of allocating a complete object) put only the used fields into registers or on the stack. Every object method must be inlined to work with the new locations for the fields. The result is that no real object allocation in memory has to be performed. If very few fields are used from the original object, then the performance speedups come from not having to initialize all of the object memory, nor having to run the full constructor. The field accesses will also be faster if the fields are moved into registers. For garbage collecting languages, not having to allocate the object is also a significant saving, since avoided allocations means less frequent garbage collects.

The following example shows how object dematerialization is applied to a calculation of a person's age, which is a common problem in industrial software code. Instead of simply subtracting the birth year from the current year, a Person object can be created that encapsulates the name and the birth year of the person. The name is empty since the code only uses the object method get_age to calculate the age. A get_age function can simply subtract the birth year from the current year:

```
int calculate age(int birth, int current year)
{
    Person p = new Person("", birth);
    return p.get_age(current_year);
}
```

After inlining has been performed the equivalent pseudocode will be:

```
int calculate age(int birth, int current year)
{
    Person p = new Person( );
    p.name = "";
    p.birth_year = birth;
    return current_year-p.birth_year;
}
```

The compiler can detect that p does not escape the scope, and that only certain fields are used. Thus it can perform both object dematerialization (i.e. move the name and birth_year into local variables), and the removal of unused variables (i.e. the name variable):

```
int calculate age(int birth, int current year)
{
    int birth_year = birth;
    return current_year-birth_year;
}
```

In the above example it is easy to determine if the object escapes the scope or not. Unfortunately current Java programs do not offer many opportunities for plain object dematerialization. For languages with explicit destructors, such as C++, it is often obvious to the compiler if an object escapes or not. However, this is not possible in garbage collected languages without explicit destructors, such as Java. Also it is common that an object is injected into the code path as an argument, or as the return value from a function. In these cases the object must be considered to escape, since the system has no control over the code outside of the current scope.

SUMMARY

Disclosed herein is a system and method for partial software object dematerialization, as may be used for example within a virtual machine (VM), or a Java Virtual Machine (JVM). In accordance with an embodiment, the system allows for applying partial object dematerialization to situations where the object is either created locally, or is retrieved from external code where it might have already escaped. In accordance with an embodiment, the system comprises a computer; a virtual machine for executing a software application; memory space for the application byte code and the generated machine code; and a compiler with an object dematerializer, and dematerializer injector. Runtime partial object dematerialization code is injected into the intermediate code representation in such a way that additional or standard optimizer techniques can be applied to it.

DETAILED DESCRIPTION

Described herein is a system and method for using partial object dematerialization in a virtual machine environment. As described herein, object dematerialization is an optimization technique that puts the contents of a locally-allocated (i.e. located within a function or similar scope) Java object into registers. To provide for this, the optimizer has to detect that the object does not escape from the function. Thus the code compiler needs not reassemble the object after the function is done. This can provide great improvements in speed, since the allocation rate decreases, and this in turn reduces the amount of CPU or processor-power that has to be spent on garbage collecting.

In addition, accessing registers is usually faster than storing the results in a memory object. If not all fields of a Java object are used, then the unused fields do not make use of registers or memory space. Unfortunately current Java programs do not offer many opportunities for plain object dematerializations. The control flow is usually so complex that the object is considered to escape even when it does not. In accordance with an embodiment, a system and method is provided that enables different control flow paths to diverge, and then merge again, and yet still keep an object dematerialized, or partially dematerialized for the different paths. This provides the performance benefits of plain object dematerialization to a larger set of possible Java applications.

Figure 1:
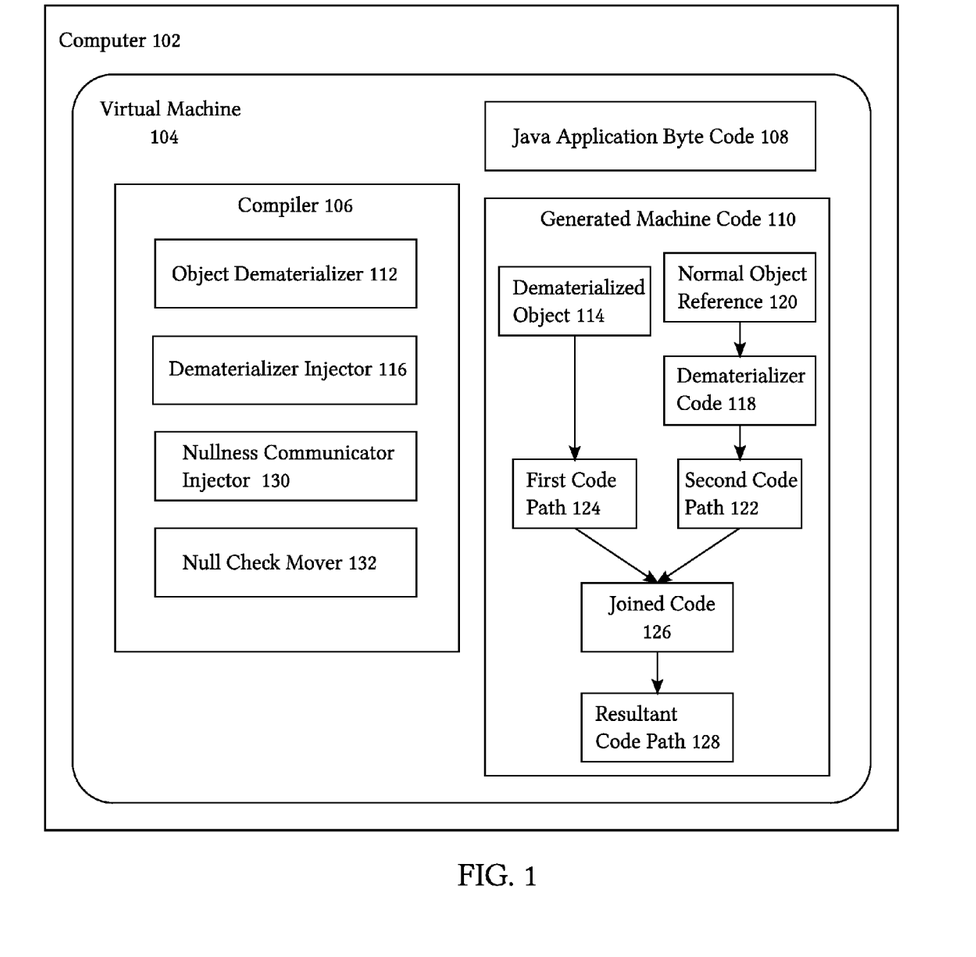
FIG. 1 shows an illustration of a system for partial software object dematerialization in accordance with an embodiment.

FIG. 1 shows an illustration of a system in accordance with an embodiment. As shown in FIG. 1, an embodiment of the system generally comprises a computer 102 with a virtual machine 104, such as a Java virtual machine (JVM) executing thereon. A compiler 106 is provided to compile Java application byte code 108 into generated machine code 110. In accordance with an embodiment, the compiler further comprises an object dematerializer 112, a dematerializer injector 116, a nullness communicator injector 130, and a null check mover 132.

Although illustrated as shown in FIG. 1 for ease of understanding, each of the above components or features can be provided by logic or programming within or as part of the compiler itself, and need not be provided as discrete or individual components. The object dematerializer can be used to generate machine code that initializes the fields of a dematerialized object 114, to create a first code path 124. The dematerializer injector can simultaneously be used to inject dematerializer code 118, by receiving a normal object reference 120, and transforming a code path with the normal object reference into a second code path 122 using dematerialized object fields. These first and second code paths are effectively joined together 126 into a resultant code path 128 that continues to use the dematerialized object. The nullness communicator injector injects code into the code path using dematerialized object fields that preserves the null pointer exception semantics of the Java application. The null check mover moves null checks from the resultant code path into the dematerializer code 118.

In accordance with prior methods of using object dematerialization, all paths leading into a join are examined for object allocations. Such prior methods can only apply object dematerialization and join the code paths if all of the code paths going into the join contain allocations of the object to be dematerialized.

In accordance with an embodiment, it is permissible to have a code path 120 into the join materialize from something other than an allocation; for example the return value from a call, an argument to the current function, or some other escape unsafe construct. In accordance with an embodiment, the object instance returned from the call is dematerialized 118 into a dematerialized object on the path into the join 122. This is permissible if it can be guaranteed that exception semantics are maintained, and that the paths between the call return and all uses of the object contain no synchronization points or writes to the object. None of the read fields of the object may be volatile. This means that the dematerialized object can ignore external changes to the original object while executing the code path from normal object reference 120 and a last use somewhere in resultant code path 128, and can still conform to the Java Memory Model specified by the Java Memory Model and Thread Specification Revision Java Specification Request (JSR-133), which is incorporated herein by reference.

Figure 2:
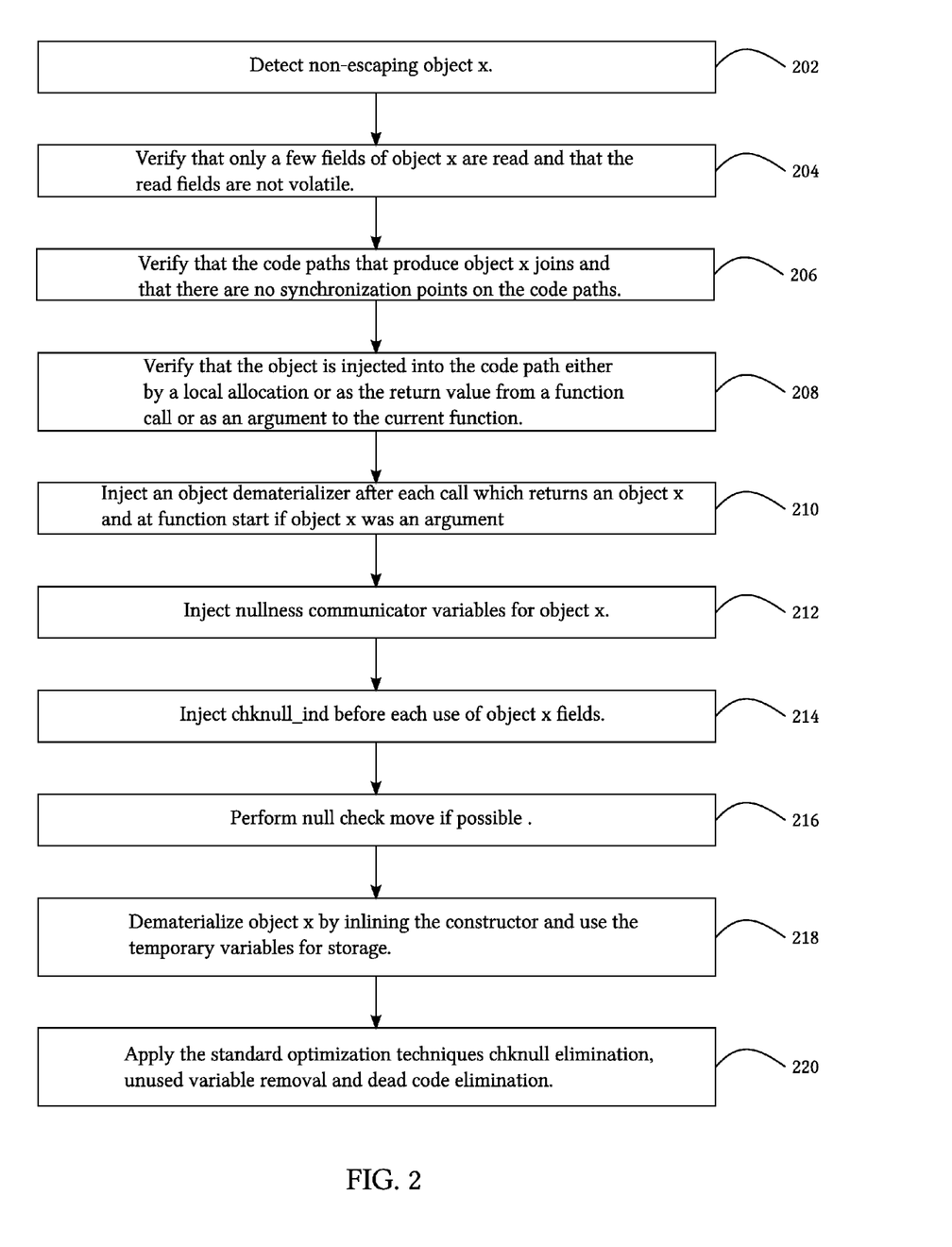
FIG. 2 shows a flowchart of a method for applying partial object dematerialization, in accordance with an embodiment.

FIG. 2 shows a flowchart of a method in accordance with an embodiment for applying partial object dematerialization. As shown in step 202, the compiler first detects that an object x is not explicitly escaping after it has been injected into the code path, even though it might have escaped before it was injected into the code path. In step 204, the compiler then verifies that only a few fields of the object are read, and that the read fields are not volatile. In step 206, the compiler determines that that all uses of object x join into a single code path, and that the code paths do not contain any synchronization points. In step 208, the compiler also verifies that object x is only created locally or injected as a return value from another function or as an argument. If this is the case, then object x is suitable for partial object dematerialization.

To begin the partial object dematerialization, in step 210, the compiler first injects a runtime object dematerializer after each call, and then, in step 212, injects nullness communicator variables for object x. In step 214, the compiler inserts a chknull_ind or another form of null indicator before each use of fields in object x, and performs a chknull_ind elimination where chknull_inds are removed if they are dominated by identical chknull_inds. In step 216, the compiler checks if the null check move optimization can be applied, and does so if possible. Finally, in step 218, the compiler performs the actual object dematerialization, where the constructor is inlined and the temporary variables are used for storage instead of the actual object. As an optional step 220, if additional or standard optimization techniques have been applied to resulting intermediate single static assignment (ssa) representation, then the resulting machine code will be highly optimized for several cases where a non-escaping, but potentially already escaped, object is used.

Figure 3:
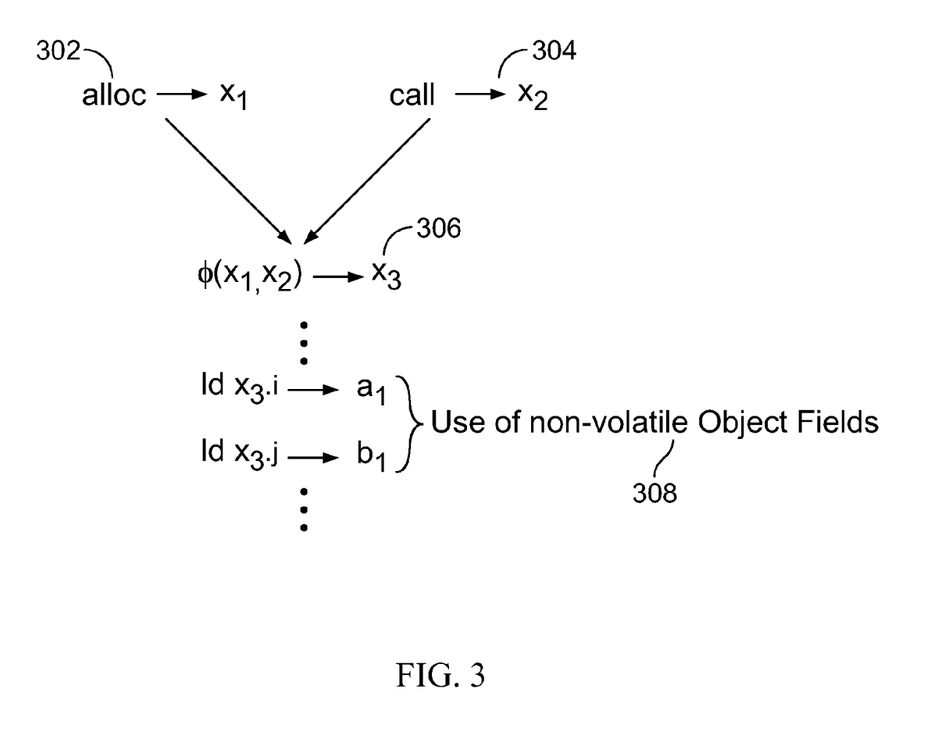
FIG. 3 shows an illustration of the intermediate single static assignment (ssa) representation of the application being compiled, in accordance with an embodiment.

FIG. 3 shows an illustration of the intermediate single static assignment representation of a part of the application being compiled in accordance with an embodiment. As shown in FIG. 3, a first (shown here as left hand side) code path 302 of the object x is injected into the joined code path 306 by allocating the object locally. A second (shown here as right hand side) code path 304 of the object x is injected into the joined code path through the return value from a function call. In this example, only two fields 308 (i and j) are read from object x and stored into the new variables a and b. Typically, a normal object dematerialization expects all code paths to inject the object by local allocation, and therefore the situation would not be treatable by the normal object dematerialization. However, embodiments of the present invention enable partial object dematerialization to be used in situations like this.

Figure 4:
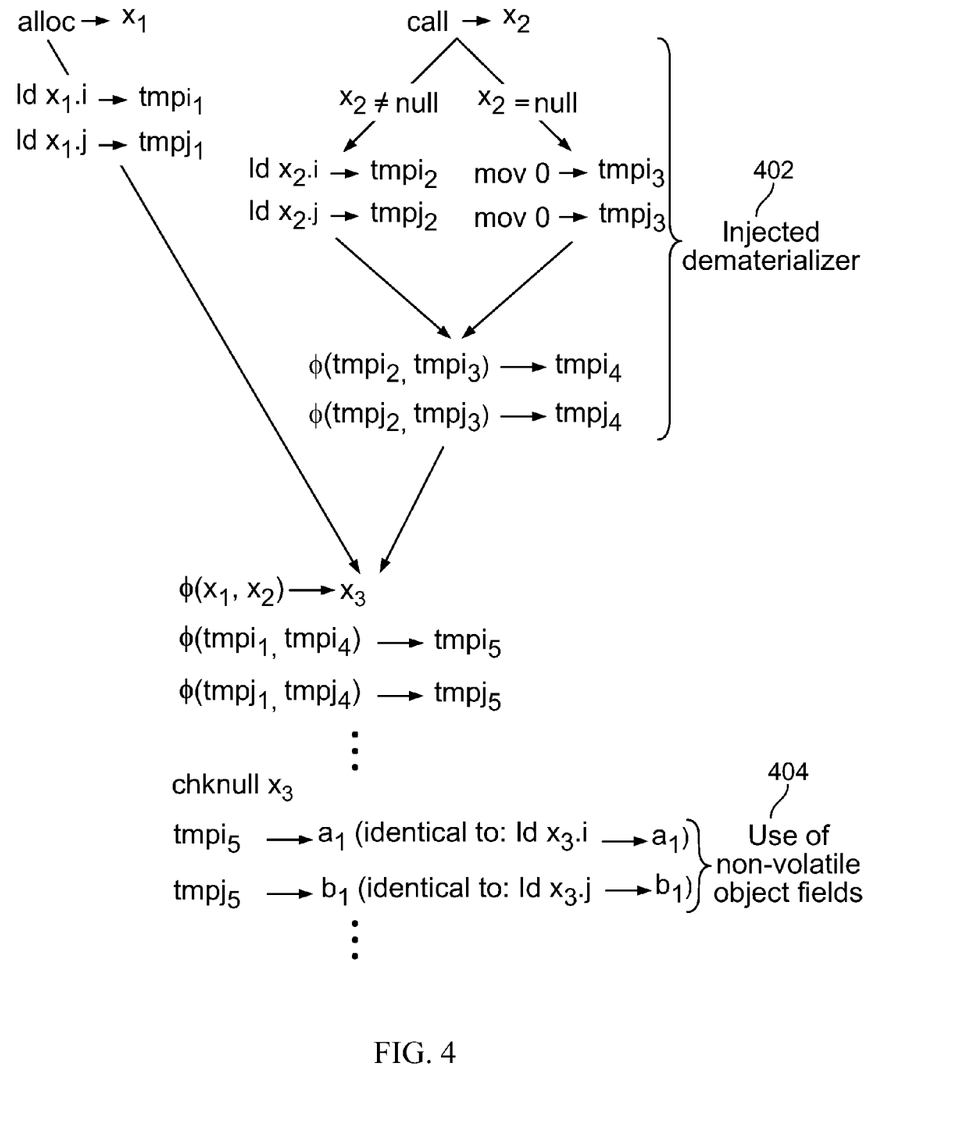
FIG. 4 shows an illustration of the intermediate single static assignment representation, illustrating the purpose of the object dematerializer and the injector, in accordance with an embodiment.

To further illustrate the process of partial object dematerialization, FIG. 4 shows the intermediate single static assignment representation after the object dematerializer and the dematerializer injector has partially performed their work.

In this example, the object dematerialization logic has identified that only two non-volatile fields are used from object x; that the uses are only reads; and that writes are not allowed. The logic has also verified that there are no synchronization points within the code paths. New temporary variables are therefore introduced to store the contents of the dematerialized object. These variables are shown here as tmpi and tmpj. For clarity, the actual allocation and use of x has still not been removed. The Java memory model as specified by JSR-133 does not guarantee ordering between multiple threads accessing normal variables. It is therefore allowed to essentially take a snapshot of the values of the object returned by the function at the time immediately after the function returns, even though the actual use of these objects happens significantly later in the code path. The injected dematerializer 402 can perform this snapshot and gracefully handle the situation when the returned object is null. The actual use of the fields 404 behave identically to the original code in respect to the actual values found in object x. A new operation is inserted into the intermediate representation to preserve the null pointer exception semantics. The chknull operation will throw a null pointer exception if the variable it checks contains a null instead of an object. If the chknull had not been inserted, then the application would not throw a null pointer exception when the function call in the right code path returns null instead of a valid object x.

The intermediate single static assignment representation is now in a form where the possible optimizations are more visible. If the operation alloc→$x_1$ can be inlined, and if the null pointer exception semantics can be preserved, then the object x can be dematerialized at compile time along the first (left hand side) code path, and the object x can be dematerialized at runtime along the second (right hand side) code path.

Unfortunately, the chknull requires that object x exists, and this contradicts the intention to dematerialize object x. In accordance with an embodiment, this contradiction can be resolved by introducing a nullness communicating variable. This variable can be used to indicate if the object x was null, without actually needing to store the object x itself. To act on the contents of the nullness communicating variable an operation called chknull_ind can be used that performs an indirect check if a variable is null through an normal integer variable. This operation takes an integer variable as the argument. If this integer variable is 0, then no null pointer exception is thrown; otherwise a null pointer exception is thrown.

An example pseudo code illustrating this operation would look like:

```
void chknull_ind(int x) {
    if (x == 1) {
        throw new NullPointerException(line number);
    }
}
```

Figure 5:
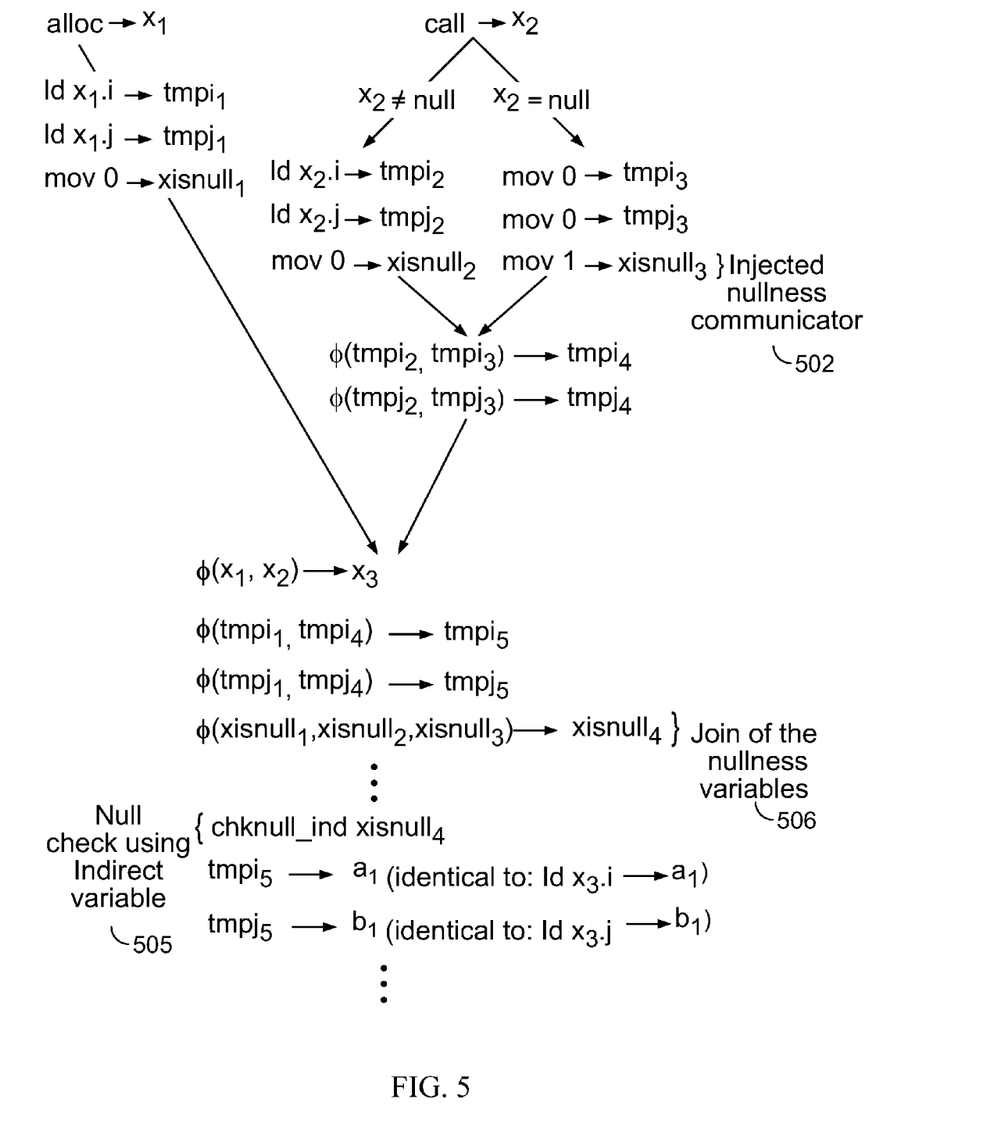
FIG. 5 shows an illustration of the intermediate single static assignment representation of the application being compiled wherein a nullness communicating variable has been injected, in accordance with an embodiment.

FIG. 5 shows an illustration of the intermediate single static assignment representation of the application being compiled where a nullness communicating variable has been injected in accordance with an embodiment.

As shown in FIG. 5, in accordance with an embodiment, the control flow has been modified with an injected nullness communicator 502, where a nullness communicating variable has been inserted, and at 505 where the nullness communicating variable is used for an indirect null pointer check. A costly search can be avoided for the first previously faulting instruction dominating all others by inserting a chknull_ind before every use of the variable x, and using standard chknull elimination techniques to remove the redundant chknulls. This means that if a chknull is dominated by an identical chknull, then the dominated chknull is redundant and can be removed. A normal ssa join 506 is used for the new variables. This provides an additional benefit in that standard compiler optimization techniques can be used remove unnecessary nullness communicating variables. The pseudo code in chknull_ind that throws the exception is explicitly tagged as low frequency to make sure the standard scheduler algorithm will schedule it late. The checknull_ind also encodes the origin of the exception, such as the line number in the source code.

In accordance with an embodiment, yet another optimization can be implemented using the null check mover 130. If a chknull_ind isnullx remains after chknull_ind-elimination, and that chknull_ind isnullx is the first potentially null pointer throwing operation after the join, then it is possible to use the compiler knowledge of where isnullx is set to 1 to move the chknull_ind. Since isnullx was introduced by the compiler, it will instantly know in which branches the chknull_ind will throw an exception. Therefore the compiler can move the chknull_ind into those particular branches in the runtime object dematerializer. This is possible since the checknull_ind encodes the origin for the exception before the move. An example pseudo code for this optimization looks like:

```
if (the first potentially null pointer throwing
    operation after the x join is a chknull_ind xisnull
    and this is the only remaining of its kind)
{
    move the chknull_ind into the code path(s) of
    the runtime object dematerializer where isnullx is set
to 1
}
```

Figure 6:
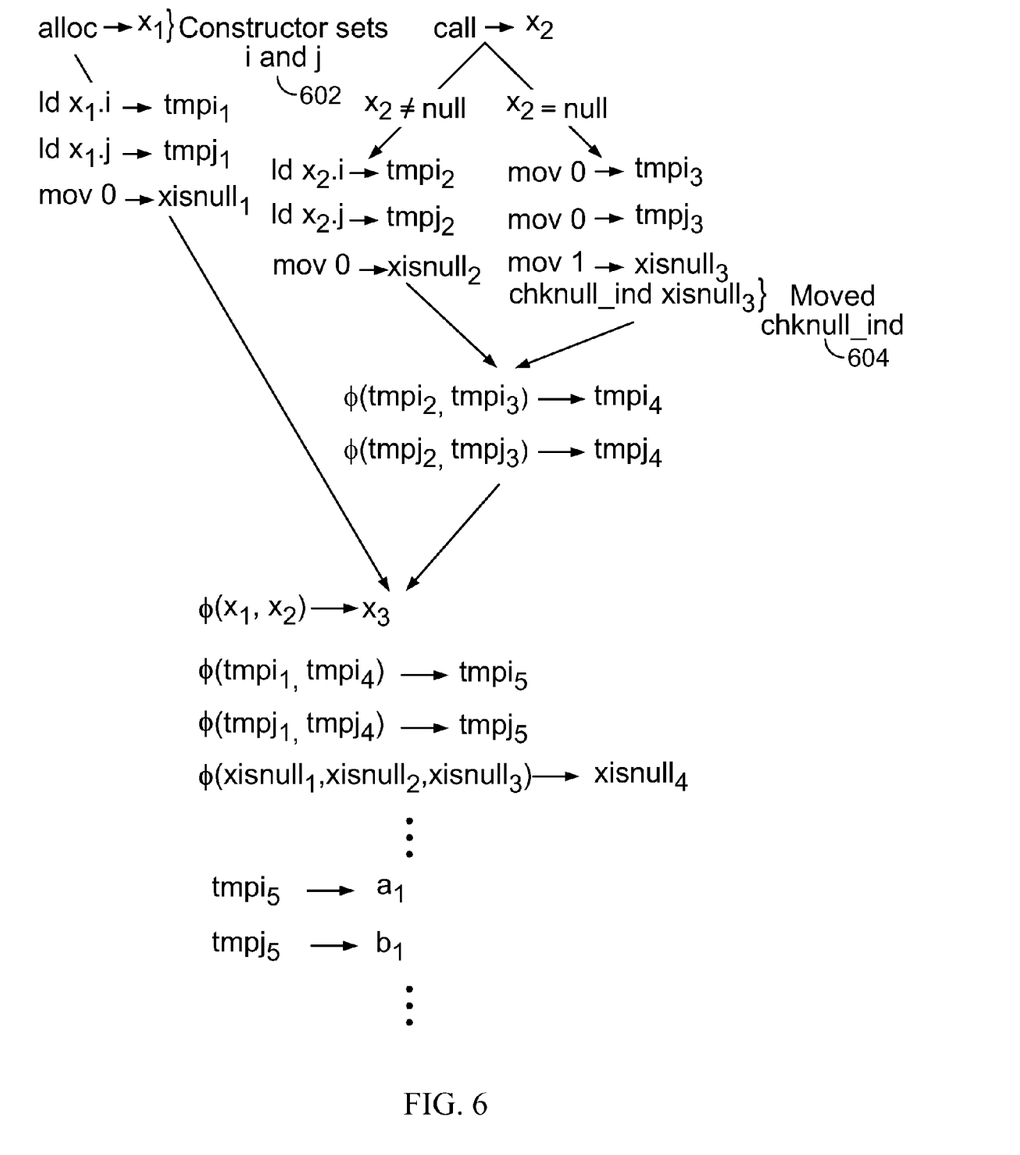
FIG. 6 shows an illustration of the intermediate single static assignment representation of the application being compiled after the null check mover has been applied, in accordance with an embodiment.

The resulting intermediate single static assignment representation is shown in FIG. 6. As shown in FIG. 6, the compiler can now apply inlining of the x constructor 602.

In this particular example, consider that the values for the two fields evaluate at compile time to 17 and 71. The standard optimizing techniques for unused variable removal and dead code removal are then applied. The moved chknull_ind now resides inside the dematerializer 604.

Figure 7:
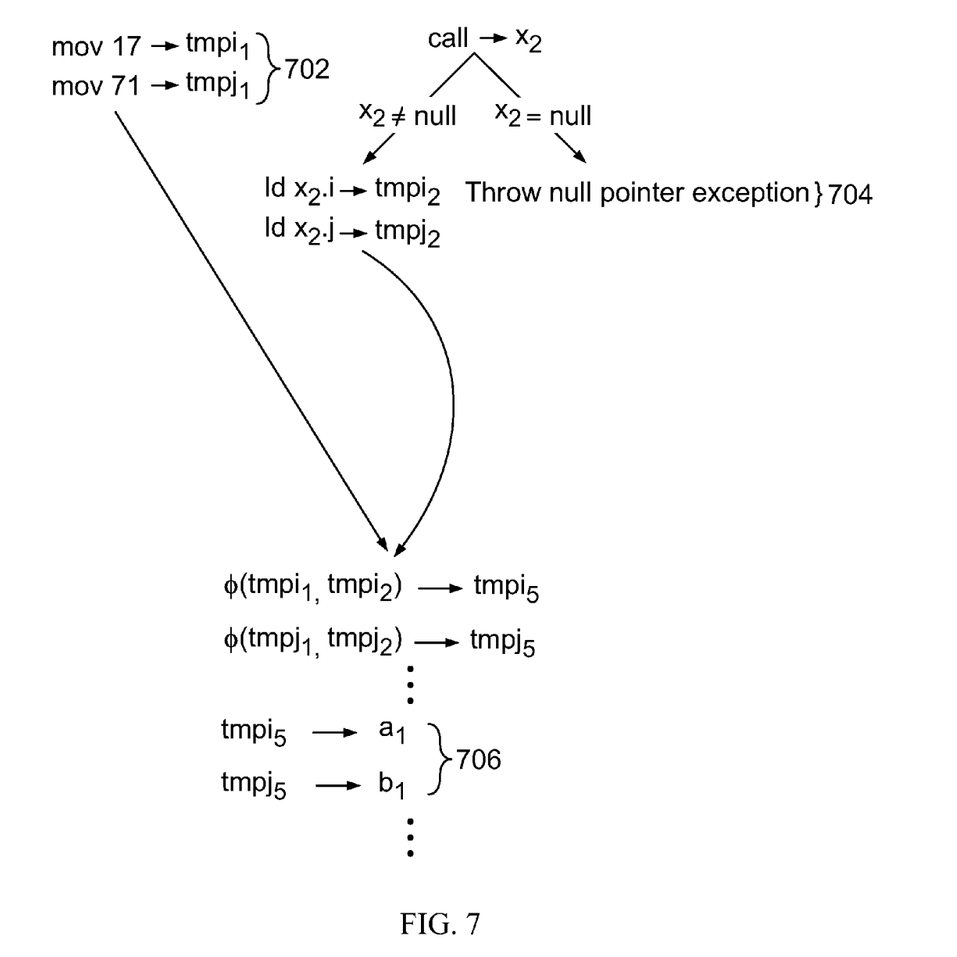
FIG. 7 shows an illustration of the intermediate single static assignment representation of the application being compiled after the standard optimizer techniques have been applied, in accordance with an embodiment.

The resulting intermediate single static assignment representation is shown in FIG. 7. As shown in FIG. 7, the system has successfully dematerialized object x. The constructor has been fully inlined 702. The optimizer has also detected using standard optimizer techniques that $xisnull_3$ will always be true for codepath 704 and therefore removed all code except the nullpointer exception throwing code. All other codepaths reaching 706 will have xisnull=0 which means that null pointer checking can be removed from all codepaths except 704. During the compilation process several variables were introduced to communicate the nullness for dematerialized variables. These variables behave as normal variables, and can therefore be optimized away using standard optimization techniques. Together with the new indirect null check mover the resulting code has become highly suitable for optimization. The resulting code has no runtime check for null in the joined code path. The register allocator in the compiler can now place the variables $tmpi_1$, $tmpi_2$, $tmpi_5$ and $a_1$ into a single register, and use a second register for $tmpj_1$, $tmpj_2$, $tmpj_5$ and $b_1$.

The present invention may be conveniently implemented using one or more conventional general purpose or specialized digital computer, computing device, machine, or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for generating machine code from byte code in virtual machines, comprising:
   a computer including a virtual machine running thereon, for executing a software application, and further including a memory space or storage medium for storing byte code as part of the software application; and
   a compiler, further comprising
      an object dematerializer that determines, during compilation of the software application, that an object is suitable for dematerialization, and, if the object is suitable for dematerialization, generates machine code that initializes fields of a dematerialized object, to create a first code path, and
      a dematerializer injector that simultaneously, during compilation, injects dematerialization code to create a second code path, by
         receiving a normal object reference, and
         transforming a code path with the normal object reference into the second code path using dematerialized object fields;
   wherein the compiler then joins the first and second code paths together into a resultant code path that continues to use the dematerialized object.

2. The system of claim 1, wherein one or more indirect null checks are used to preserve application behavior on null pointer exceptions.

3. The system of claim 2, wherein the indirect null checks are implemented using nullness communicator variables.

4. The system of claim 3, wherein the nullness communicator variables are implemented using single static assignment variables.

5. The system of claim 2, wherein the compiler moves one or more indirect null checks into the code paths where the null checks would fail.

6. The system of claim 1, wherein the compiler performs the steps of:
   detecting that an object is not explicitly escaping after it has been injected,
   verifying that read fields of the object are not volatile,
   determining that that all uses of the object join into a single code path, and that the code paths do not contain any synchronization points,
   verifying that the object is created locally or injected as a return value from another function or as an argument,
   injecting a runtime object dematerializer after each call containing nullness communicator variables for the object,
   inserting a null indicator before each use of fields in the object,
   checking if a null check move optimization can be applied, and
   performing an object dematerialization where a constructor is inlined and temporary variables are used for storage instead of the actual object.

7. A method for generating machine code from byte code in virtual machines, comprising the steps of:
   providing a computer including a virtual machine running thereon, for executing a software application, and further including a memory space or storage medium for storing byte code as part of the software application; and
   compiling the software application using a compiler, further comprising
      determining that an object is suitable for dematerialization, and, if the object is suitable for dematerialization,
      generating machine code that initializes fields of a dematerialized object, to create a first code path,
      simultaneously injecting dematerializer code to create a second code path, by receiving a normal object reference, and transforming a code path with the normal object reference into the second code path using dematerialized object fields, and
      joining the first and second code paths together into a resultant code path that continues to use the dematerialized object.

8. The method of claim 7, wherein one or more indirect null checks are used to preserve application behavior on null pointer exceptions.

9. The method of claim 8, wherein the indirect null checks are implemented using nullness communicator variables.

10. The method of claim 9, wherein the nullness communicator variables are implemented using single static assignment variables.

11. The method of claim 8, wherein the compiler moves one or more indirect null checks into the code paths where the null checks would fail.

12. The method of claim 7, wherein the compiler performs the steps of:
   detecting that an object is not explicitly escaping after it has been injected,
   verifying that read fields of the object are not volatile,
   determining that that all uses of the object join into a single code path, and that the code paths do not contain any synchronization points, verifying that the object is created locally or injected as a return value from another function or as an argument, injecting a runtime object dematerializer after each call containing nullness communicator variables for the object, inserting a null indicator before each use of fields in the object, checking if a null check move optimization can be applied, and performing an object dematerialization where a constructor is inlined and temporary variables are used for storage instead of the actual object.

13. A computer readable medium, including instructions stored thereon which when read and executed by a computer cause the computer to perform the steps comprising:

running a virtual machine, for executing a software application, and further including a memory space or storage medium for storing byte code as part of the software application; and compiling the software application using a compiler, further comprising determining that an object is suitable for dematerialization, and, if the object is suitable for dematerialization, generating machine code that initializes fields of a dematerialized object, to create a first code path, simultaneously injecting dematerializer code to create a second code path, by receiving a normal object reference, and transforming a code path with the normal object reference into the second code path using dematerialized object fields, and joining the first and second code paths together into a resultant code path that continues to use the dematerialized object.

14. The computer readable medium of claim 13, wherein one or more indirect null checks are used to preserve application behavior on null pointer exceptions.

15. The computer readable medium of claim 14, wherein the indirect null checks are implemented using nullness communicator variables.

16. The computer readable medium of claim 15, wherein the nullness communicator variables are implemented using single static assignment variables.

17. The computer readable medium of claim 14, wherein the compiler moves one or more indirect null checks into the code paths where the null checks would fail.

18. The computer readable medium of claim 13, wherein the compiler performs the steps of:

detecting that an object is not explicitly escaping after it has been injected, verifying that read fields of the object are not volatile, determining that that all uses of the object join into a single code path, and that the code paths do not contain any synchronization points, verifying that the object is created locally or injected as a return value from another function or as an argument, injecting a runtime object dematerializer after each call containing nullness communicator variables for the object, inserting a null indicator before each use of fields in the object, checking if a null check move optimization can be applied, and performing an object dematerialization where a constructor is inlined and temporary variables are used for storage instead of the actual object.

19. The system of claim 1, wherein the virtual machine is a Java virtual machine, and wherein the software application is a Java application.

20. The method of claim 7, wherein the virtual machine is a Java virtual machine, and wherein the software application is a Java application.

* * * * *

UNITED STATES PATENT AND TRADEMARK OFFICE
CERTIFICATE OF CORRECTION

| | | |
|---|---|---|
| PATENT NO. | : 8,826,246 B2 | Page 1 of 1 |
| APPLICATION NO. | : 12/464324 | |
| DATED | : September 2, 2014 | |
| INVENTOR(S) | : Lagergren et al. | |

It is certified that error appears in the above-identified patent and that said Letters Patent is hereby corrected as shown below:

In the Specification

In column 4, line 31, delete "that that" and insert -- that --, therefor.

In the Claims

In column 8, line 12, in Claim 6, delete "that that" and insert -- that --, therefor.

In column 8, line 65, in Claim 12, delete "that that" and insert -- that --, therefor.

In column 10, line 15, in Claim 18, delete "that that" and insert -- that --, therefor.

Signed and Sealed this
Twenty-fourth Day of March, 2015

Michelle K. Lee
*Director of the United States Patent and Trademark Office*